(12) United States Patent
Yu

(10) Patent No.: US 7,300,174 B2
(45) Date of Patent: Nov. 27, 2007

(54) MULTICOLOR LIGHT SOURCE AND BACKLIGHT MODULE USING THE SAME

(75) Inventor: Tai-Cherng Yu, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 148 days.

(21) Appl. No.: 11/145,107

(22) Filed: Jun. 3, 2005

(65) Prior Publication Data

US 2005/0281026 A1   Dec. 22, 2005

(30) Foreign Application Priority Data

Jun. 18, 2004   (TW)   .............................. 93117698 A

(51) Int. Cl.
*F21V 9/00*   (2006.01)
(52) U.S. Cl. ...................... 362/231; 362/249; 362/612; 362/613
(58) Field of Classification Search ................ 362/231, 362/240, 249, 611, 612, 613, 621, 340
See application file for complete search history.

(56) References Cited

U.S. PATENT DOCUMENTS

| | | | | |
|---|---|---|---|---|
| 4,756,017 A | * | 7/1988 | Bush | 379/23 |
| 6,288,700 B1 | | 9/2001 | Mori | 345/102 |
| 6,297,598 B1 | * | 10/2001 | Wang et al. | 315/169.3 |
| 6,608,614 B1 | | 8/2003 | Johnson | 345/102 |
| 6,905,228 B1 | * | 6/2005 | Takeyasu et al. | 362/249 |
| 7,002,546 B1 | * | 2/2006 | Stuppi et al. | 345/102 |

* cited by examiner

*Primary Examiner*—John Anthony Ward
(74) *Attorney, Agent, or Firm*—Morris Manning Martin LLP; Tim Tingkang Xia, Esq.

(57) ABSTRACT

A backlight module (20) includes a light guide plate (200) and a light source (10). The light guide plate includes a light incident surface (220) opposite to the light source. The light source includes a plurality of multicolor based LEDs (120) and the LEDs each includes a plurality of LED chips (120A/B/C). The light source can achieve colored light beams with fewer LEDs, and no color filter is needed in the backlight module or a liquid crystal display using the light source. Thus, the cost of the backlight module can be reduced.

8 Claims, 2 Drawing Sheets

MULTICOLOR LIGHT SOURCE AND BACKLIGHT MODULE USING THE SAME

BACKGROUND

1. Field of the Invention

The present invention relates to a light source, and especially to a light source used in a backlight module for a device such as a liquid crystal display.

2. General Background

Liquid crystal displays are commonly used as the display device for compact electronic apparatuses, because they not only display good quality images with little power but also are very thin. However, the liquid crystals in a liquid crystal display do not emit any light themselves. The liquid crystals have to be lit up by a light source so as to clearly and sharply display text and images. Typically, light emitting diodes (LED) are used as light sources because of their high luminance and low loss.

A typical backlight module 40 as shown of FIG. 4 includes a light guide plate 400. The light guide plate 400 has a surface 420 functioning as a light incident surface, and a surface 440 opposite to the light incident surface 420 functioning as a light emitting surface. A plurality of cold cathode fluorescent lamps (CCFLs) 422 are arranged parallel to each other on a substrate 410 so that they are opposite to the light incident surface 420. Light beams from the light source 422 enter the light guide plate 400 through the light incident surface 420, and finally emit out from the light guide plate 400 through the light emitting surface 440.

However, the high voltage and high current intensity of the CCFLs 422 lead to heavy power consumption, especially in notebook computer applications. In contrast, an LED light source has the advantage of low voltage and low current intensity, which provide low power consumption. Thus, replacing a CCFL light source with an LED light source can save a lot of power.

FIG. 5 is a schematic, side cross-sectional view of a conventional light source 50. The light source 50 includes a plurality of LED groups 520 arranged on a substrate 500.

FIG. 6 is a top plan view of the light source 50. Each LED group 520 includes three LEDs: a red LED 520A, a green LED 520B, and a blue LED 520C, which are arranged in a particular configuration relative to each other. Since all colors can originate from the three primary colors red, green and blue, each primary color LED 520A/B/C can emit from 32 to 256 gray levels. Thus, the combination of three primary color LEDs 520A/B/C can achieve from 32,768 to $16 \times 10^6$ gray levels. The light source 50 has the advantage of low power consumption, and different colors can be achieved by controlling respective outputs of the primary color LEDs 520A/B/C.

However, the LED light source 50 generally requires a large number of the primary color LEDs 520A/B/C. In addition, and the arrangement of the primary color LEDs 520A/B/C is fixed, and manufacturing of the fixed arrangement of the primary color LEDs 520A/B/C can be problematic.

What is needed, therefore, is a backlight module and a light source used therein which are relatively inexpensive.

SUMMARY

In one preferred embodiment, a light source includes a plurality of multicolor based LEDs, with the LEDs each comprising a plurality of LED chips.

It is of advantage that the light source can achieve colored light beams with fewer LEDs than that of comparable prior art, and no color filter is needed in a backlight module or a liquid crystal display using the light source. Thus, the cost of the backlight module can be reduced.

Other advantages and novel features will become more apparent from the following detailed description of preferred embodiments when taken in conjunction with the accompanying drawings, in which:

DETAILED DESCRIPTION

Figure 1:
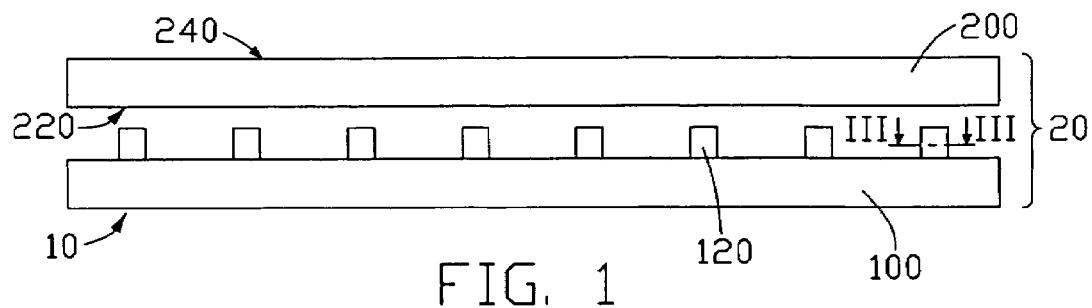
FIG. 1 is a schematic, cross-sectional view of a backlight module in accordance with a preferred embodiment of the present invention, the backlight module comprising a light source.

FIG. 1 is a schematic, cross-sectional view of a backlight module in accordance with a preferred embodiment of the present invention. The backlight module 20 includes a light guide plate 200 and a light source 10. The light guide plate 200 includes a light incident surface 220 opposite to the light source 10, and a light emitting surface 240 opposite to the light incident surface 220.

Figure 2:
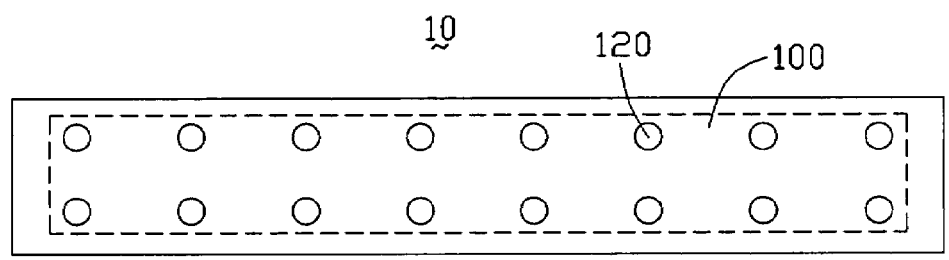
FIG. 2 is a schematic, top plan view of the light source of FIG. 1.

Referring also to FIG. 2, this is a schematic, top plan view of the light source 10. The light source 10 includes a substrate 100, and a plurality of multicolor based LEDs 120 arranged on the substrate 100.

Figure 3:
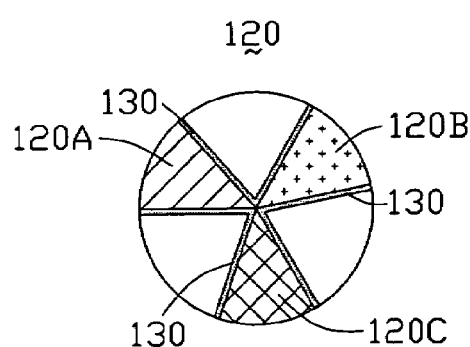
FIG. 3 is an enlarged, cross-sectional view of an LED of the light source of FIG. 1, taken along line III-III thereof.
Figure 4:
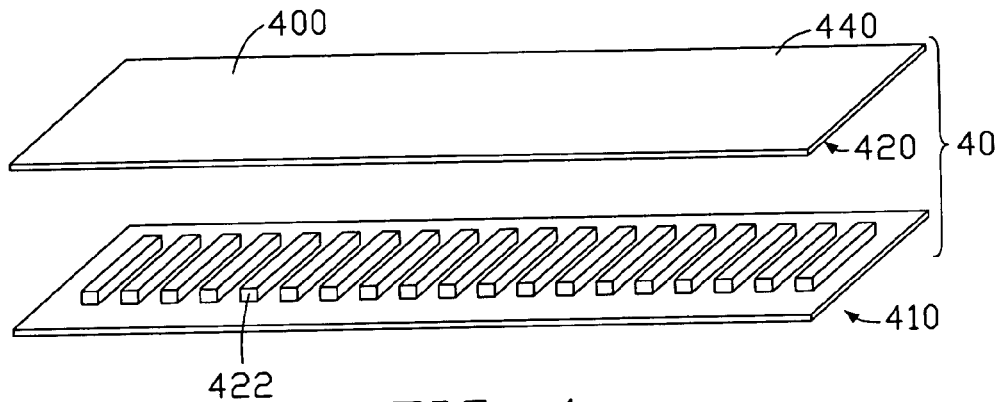
FIG. 4 is an exploded, isometric view of a conventional backlight module.
Figure 5:
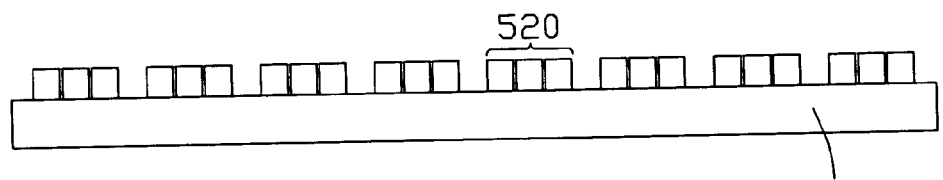
FIG. 5 is a schematic, side cross-sectional view of a conventional light source.
Figure 6:
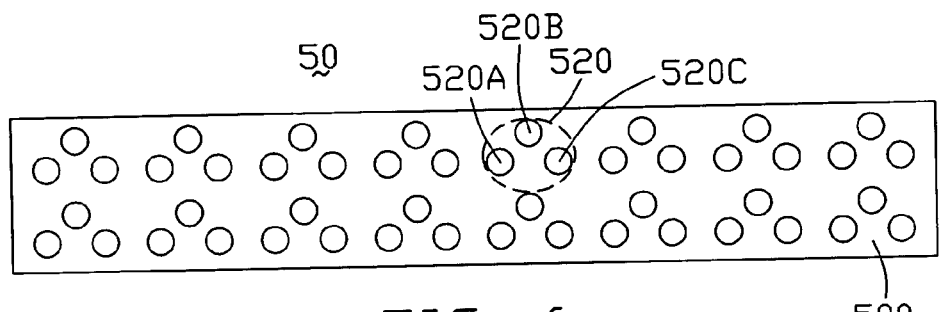
FIG. 6 is a top plan view of the light source of FIG. 5.

FIG. 3 is an enlarged, cross-sectional view of an LED 120. The LED 120 includes three independent light generating portions integrally formed therein, for example, three integrally disposed LED chips: a red LED chip 120A, a blue LED chip 120B and a green LED chip 120C. Each LED chip 120A, 120B, 120C can emit one particular kind of primary color. Each LED chip 120A, 120B, 120C can emit from 32 to 256 gray levels. Therefore by controlling the LED chips 120A, 120B, 120C of the LED 120, the combination of the LED chips 120A, 120B, 120C can achieve from 32,768 to $16 \times 10^6$ gray levels. Each of the LED chips 120A, 120B, 120C has a sector shaped cross section. The sector shaped cross section is bounded by two radii and an included arc. The LED chips 120A, 120B, 120C have the same size. The LED chips 120A, 120B, 120C are radially symmetrically arranged about a central axis of the LED 120. Thus the three sector shaped cross sections of the LED chips 120A, 120B, 120C cooperatively form a circular cross section of the LED 120. The LED 120 further includes three encapsulations 130, each encapsulation 130 surrounding a respective LED chip 120A, 120B, 120C. The encapsulations 130 can be made from resin.

When a low voltage is applied to the light source 10, light beams are emitted from the LED chips 120A, 120B, 120C, and the light beams transmit into the light guide plate 200 through the light incident surface 220. After being reflected and refracted within the light guide plate 200, the light beams eventually exit the light guide plate 200 through the light emitting surface 240.

The light source 10 includes the plurality of multicolor based LEDs 120, with each LED 120 able to emit different colors by control of the LED chips 120A, 120B, 120C therein. Therefore, fewer LEDs are required compared with a conventional monocolor light source. Accordingly, the cost of the light source 10 can be less than that of the conventional monocolor light source.

Moreover, no color filter is needed in the backlight module 20 or a liquid crystal display (not labeled) using the light source 10, because colored light is emitted by the light emitting surface 240. Thus, the cost of the backlight module can be reduced.

Furthermore, in alternative embodiments, the LEDs of the light source 10 can be two-color based LEDs, with each LED including two LED chips. That is, each LED can selectively comprise a red LED chip and a green LED chip, a red LED chip and a blue LED chip, or a blue LED chip and a green LED chip.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

I claim:

1. A light source, comprising:
   a substrate; and
   at least one multicolor based light emitting diode (LED) formed on the substrate, the at least one multicolor based LED comprising three independent light generating portions generating colored lights different from each other, the three light generating portions each having a sector shaped cross section bounded by two radii and an included arc, the three light generating portions having the same size and being radially symmetrically arranged about a central axis of the at least one multicolor based LED, the three sector shaped cross sections of the three light generating portions lying in a same circular cross section of the at least one multicolor based LED.

2. The light source as claimed in claim 1, wherein each of the three independent light generating portions is an LED chip.

3. The light source as claimed in claim 2, wherein the three light generating portions are red, blue and green LED chips.

4. The light source as claimed in claim 1, wherein the at least one multicolor based LED further comprises three encapsulations surrounding the three light generating portions respectively.

5. A backlight module, comprising:
   a light guide plate comprising a light incident surface; and
   a light source opposite to the light incident surface, the light source comprising a plurality of multicolor based light emitting diodes (LEDs);
   wherein each of the LEDs comprises three LED chips emitting colored lights corresponding to different colors respectively, each of the three LED chips having a sector shaped cross section bounded by two radii and an included arc, the three LED chips having the same size and being radially symmetrically arranged about a central axis of the LED, the three sector shaped cross sections of the three LED chips lying in a same circular cross section of the LED.

6. The backlight module as claimed in claim 5, wherein the LEDs are arranged on a substrate.

7. The backlight module as claimed in claim 5, wherein the three LED chips are red, blue and green LED chips.

8. The backlight module as claimed in claim 5, wherein each of the LEDs further comprises three encapsulations surrounding the three LED chips respectively.

* * * * *